May 28, 1929.  J. E. POINTON  1,714,815
OVEN
Filed June 10, 1926
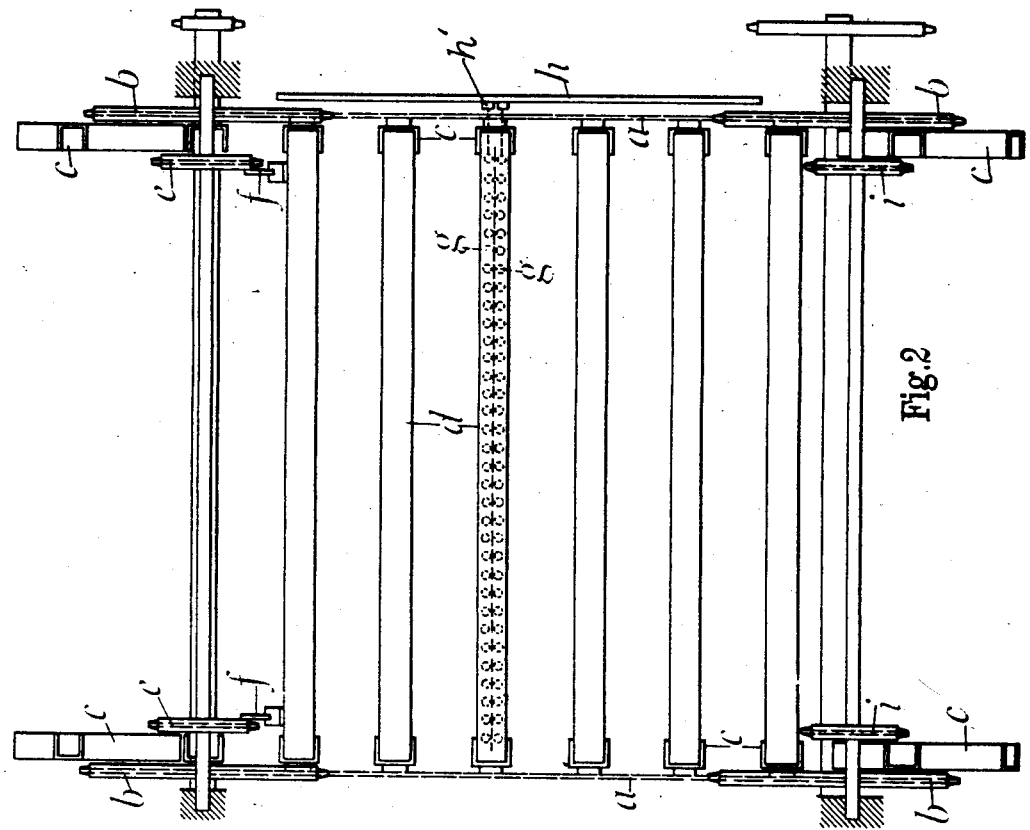
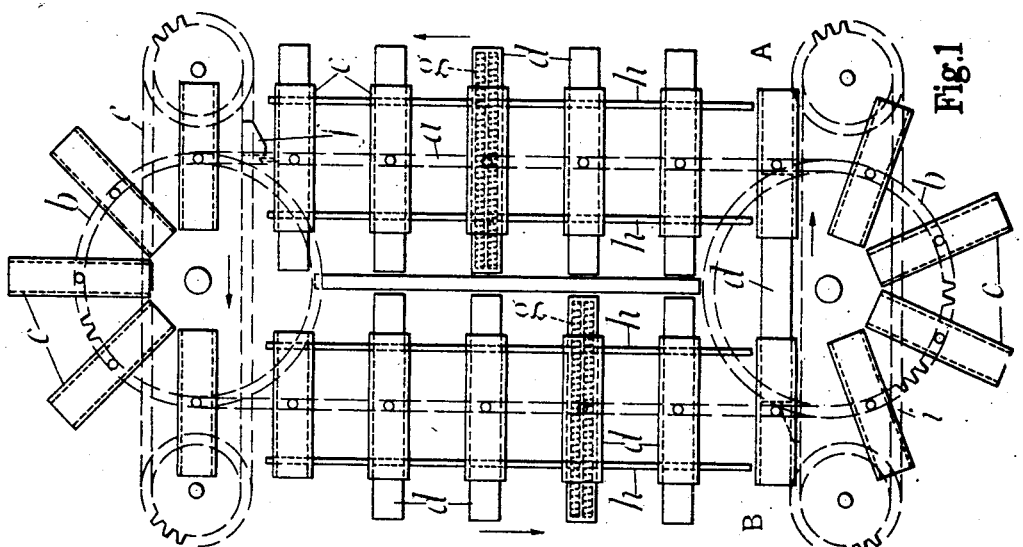
J. E. Pointon
inventor
By Marks & Clark
Attys Patented May 28, 1929.

1,714,815

UNITED STATES PATENT OFFICE.

JOHN EDWARD POINTON, OF LONDON, ENGLAND, ASSIGNOR TO BAKER PERKINS COMPANY INCORPORATED, OF NEW YORK, N. Y.

OVEN.

Application filed June 10, 1926, Serial No. 115,074, and in Great Britain June 16, 1925.

This invention relates to ovens, for such services as the baking of bread, biscuits and the like or the heat treatment of other goods, and of the type wherein the goods or articles are placed on plates or trays which are caused to ascend and descend in the baking chamber.

The invention has for its object the construction of a compact oven of the said type adapted for convenient and effective electric heating.

The invention comprises an endless conveyor adapted to effect the ascent and descent in the oven of the plates or trays with the goods thereon, the said trays having electric coils or heating elements arranged therewith adapted to impart top and bottom heat to the goods during such ascent and descent, means being provided whereby the trays together with the goods and the heating elements are transferred from the ascending to the descending side of the conveyor and kept at the horizontal during such transference, also to return the trays from the descending to the ascending side of the conveyor.

Referring to the accompanying sheet of explanatory drawings:—

Figure 1 is a front or end elevation and Figure 2 is a side elevation showing in diagrammatic form, the interior of an oven as constructed in accordance with this invention.

The same reference letters in the two views indicate the same or similar parts.

In the manner of carrying the invention into effect as illustrated by the drawings, a conveyor comprising a pair of endless chains as $a$ with wheels $b$, is vertically disposed at the centre of the interior of the oven or baking chamber, such conveyor having at intervals arms or brackets as $c$ attached to the chains for the support of the plates or trays $d$ on which the goods are placed and with which the heating elements are arranged. The conveyor has a movement imparted thereto through suitable gearing and any convenient means are employed for changing the speed of such movement so that the baking period may be varied by variation of the time required for the trays to pass through the oven.

At the upper end of the interior of the oven or baking chamber there is arranged a horizontally disposed chain conveyor $e$ adapted to transfer the trays $d$, with the goods thereon and with the attached heating elements, from the ascending to the descending side of the vertical or main conveyor. For such purpose the said transfer or horizontal conveyor $e$ is fitted with lugs or projections as $f$ which engage the plates and push or slide the same from the supporting brackets $c$ on the one side of the vertical conveyor to the brackets on the other side of same. The said supporting brackets $c$ are so spaced throughout the chains $a$ of the vertical conveyor as to ensure that when the plates or trays $d$ are transferred as aforesaid as they successively approach the top of the oven or baking chamber, there will be brackets on the descending side suitably placed in relation to those on the ascending side to permit of the said transference with the maintenance of the trays at the horizontal.

The heating coils or elements of each tray are so grouped or arranged that they impart a bottom heat to the goods on such tray and also a top heat to the goods on the tray below it, the respective groups of coils being insulated in order that the goods may be subjected to a top or a bottom heating alone if so desired. The electric current for the coils or heating elements is collected by brushes or the like from conductors disposed within the oven and charged from the electric supply mains or otherwise in any ordinary manner.

In the example illustrated the heating coils or elements $g$ are indicated in the interior of two of the hollow or box like trays $d$ at Figure 1 and in one of the trays at Figure 2.

It will be understood that all the trays are provided with electric heating elements.

The conductors for the supply of current are indicated by the reference letter $h$. One of the collecting brushes (which are of any well known form) is indicated at $h'$ Figure 2.

The combination of the heating elements with the plates or trays facilitates ready and convenient renewals. Such trays can be passed in and out of the oven and thus any one of them can be readily replaced in the event of a coil burning out or otherwise.

A transfer or horizontal conveyor $i$ is arranged at the bottom of the oven, similar to the conveyor $e$ at the top of the oven. The directions of movement of the conveyors are all indicated by the arrows.

The loading of the trays with the goods and the withdrawal of the same therefrom may be effected from one and the same side of the oven or from opposite sides. When loading and discharging is effected from the same side as, for example, at the right hand side of Figure 1 and at the position A, the bottom conveyor $i$ slides the trays with loaves thereon from the descending to the ascending side of the vertical or main conveyor. When the loading and discharging of the trays is effected from opposite sides of the oven, the withdrawal of the loaves can be effected at the position B and the empty trays returned by the conveyor $i$ to the loading position at A.

Having thus described my invention what I claim as new and desire to secure by Letters Patent is:—

In bread baking and like ovens, the combination comprising an endless conveyor ascending and descending within the oven, brackets attached to said conveyor at equal intervals therealong, trays supported by said brackets for the reception of the goods to be conveyed through the oven, an electric heater for each tray, and conveyors extending transversely across the oven near the upper and lower ends of same, said conveyors having means thereon to engage the trays and slide them out of the said supporting brackets on the one side of the ascending and descending conveyor and into such brackets on the other side of that conveyor.

In testimony whereof I have signed my name to this specification.

JOHN EDWARD POINTON.